Figure 1:
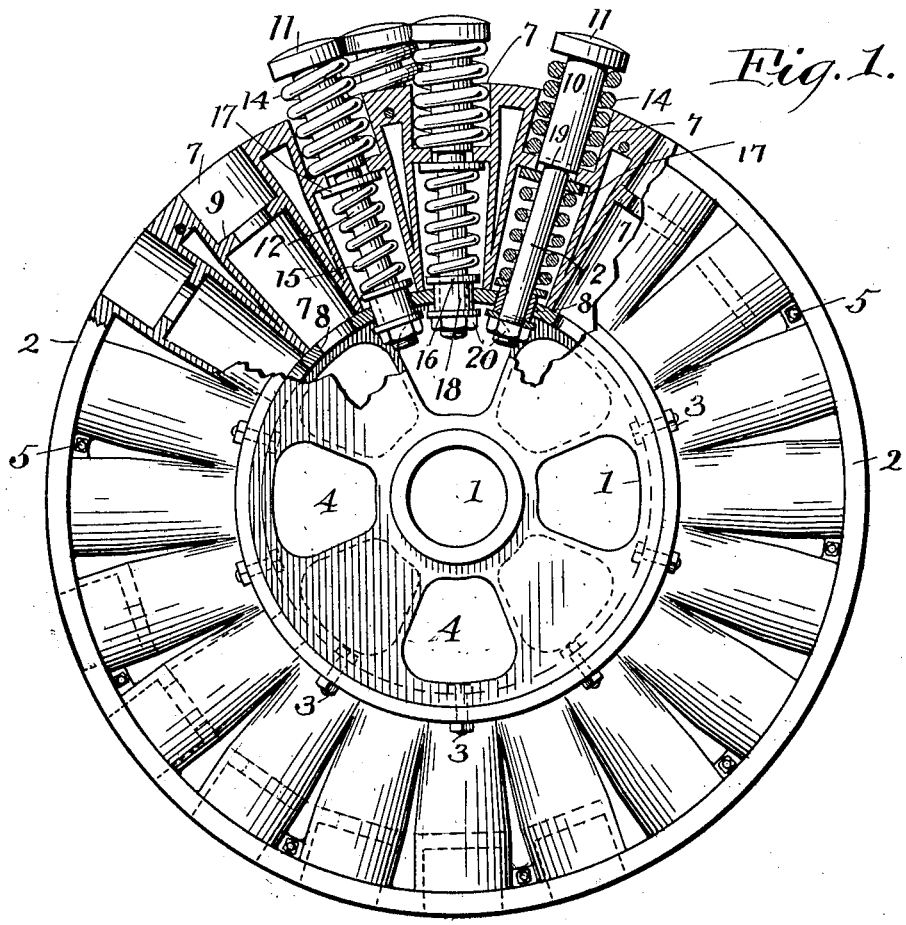

J. MURREY.
ELASTIC TREAD VEHICLE WHEEL.
APPLICATION FILED FEB. 13, 1907.

927,578.

Patented July 13, 1909.

Witnesses.
E. B. Gilchrist.
H. R. Sullivan.

Inventor
Jasper Murrey
by
Thurston Woodward

UNITED STATES PATENT OFFICE.

JASPER MURREY, OF CLEVELAND, OHIO.

ELASTIC-TREAD VEHICLE-WHEEL.

No. 927,578.     Specification of Letters Patent.     Patented July 13, 1909.

Application filed February 13, 1907. Serial No. 357,146.

*To all whom it may concern:*

Be it known that I, JASPER MURREY, a citizen of the United States, residing at Cleveland, in the county of Cuyahoga and State of Ohio, have invented a certain new and useful Improvement in Elastic-Tread Vehicle-Wheels, of which the following is a full, clear, and exact description.

A wheel embodying the present invention has a plurality of yielding radial cushions which project so as to engage with the road as the wheel rotates, each cushion being independently movable, and its inward movement being resisted by an arrangement of two springs, substantially as shown, whereby they do not offer much resistance to the initial inward movement of the cushion, but do, after the cushion has moved inward a suitable distance, rapidly increase the resistance to a continuation of such movement.

The invention resides mainly in the manner in which these springs are applied to produce the described action; but it also includes other novel features of construction and combinations of parts which contribute to the practical efficiency of the wheel, all of which is shown in the drawing and hereinafter described and definitely pointed out in the claims.

Figure 2:
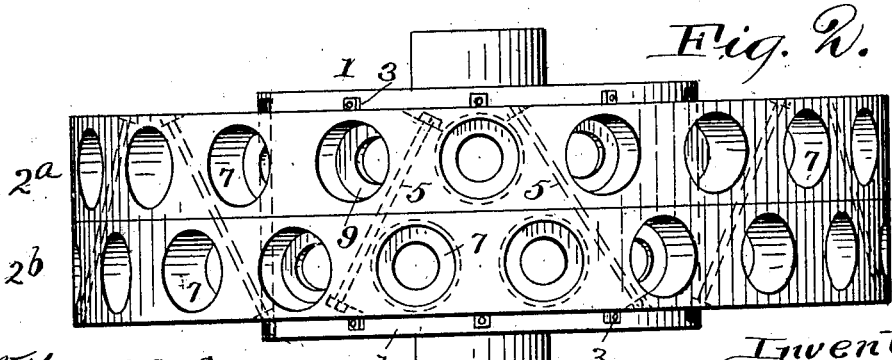

In the drawing, Figure 1 is a side elevation partly in section, of a wheel to which only four of the spring cushions have been applied; and Fig. 2 is a plan view of said wheel before any of the cushions and associated devices have been applied to it.

The wheels, as shown, consist of the hub portion 1 and a rim portion 2. The hub portion is of cylindrical form and fits a concentric opening in the rim portion. The latter has an outwardly extended flange on each side; and bolts 3 passing through this flange and through the cylindrical surface of the hub portion connect these two parts together. The hub portion is preferably a hollow casting having hand holes 4 through its side. The rim portion is made of two counterpart pieces 2ª and 2ᵇ which are secured together by bolts 5 indicated by dotted lines in Fig. 2. The described construction is thought to be novel, and is the best construction now known to me; but the principal part of the invention is not dependent upon this precise construction; nor is it intended that the claims be limited to such construction, excepting only the claims in which such limitation is plainly expressed.

In the rim are a plurality of spring barrels 7, which pass entirely through the rim in radial directions. The rim is preferably a casting, and the spring barrels shown may be formed by cores; but this is not essential to the primary invention. These spring barrels are arranged in circumferential rows, and the barrels in each row are staggered with respect to the barrels in adjacent rows. Only two of these rows are shown in the drawing, but the number of rows is not material.

When the rim is secured upon the hub, the outer periphery of the hub furnishes spring seats 8 for the several spring barrels. Across each spring barrel, at a suitable distance between its ends, is an annular flange 9 which also serves as a spring seat. The annular opening through this flange is for the passage of the plunger 10. Each barrel contains such a plunger which projects beyond the periphery of the rim and has an enlarged head 11 on its outer end. Each plunger has also an integral stem 12 of smaller diameter which extends inward, passing through a hole in the seat 8,—that is to say, a hole in the periphery of the hub, in the construction shown. The inner end of this stem within the hub is threaded.

Surrounding the plunger and lying between the head 11 and the spring seat 9 is a coiled spring 14. The external diameter of the spring is as great as the circumstances will permit in view of the requirements that it must operate within the spring barrel. The internal diameter of the spring is such that it fits the plunger 10 as closely as it can and be operative in the manner described. Another spring 15 surrounds the stem 12 lying between two washers 16 and 17, which loosely embrace the stem 12,—one of said washers being just outside of the spring seat 8, and the other being just inside the spring seat 9. A sleeve 18 fits nicely around the stem 12, and in the hole through the seat 8. A nut 20 is screwed onto the inner end of the stem within the hub. The hand holes through the sides of the hub permit the introduction and operation of such wrenches as are required to turn up these nuts. As this nut is screwed on, the first result will be to move sleeve 18, washer 16, spring 15 and washer 17 outward until washer 17 engages with the spring seat 9. As the nut is still further screwed on, both springs will be put under tension which may be regulated in accordance with the desires. The position of the parts when they have been adjusted for use, will be substantially as shown in the drawing. Each plunger and its parts, and the associated springs, etc., as described constitute a cushion.

When, in use, any cushion may come in contact with the road, so that when the cushion is called upon to sustain weight, the plunger will be forced inward more or less. The inward movement will at first be resisted by spring 14, and will be assisted by spring 15, the resistance increasing as the compression of spring 14 is increased, and the assisting force of spring 15 decreasing as it is relieved from tension, until washer 16 engages the head 8. At this time spring 15 should have resumed its normal condition. The shoulder 19 at the junction of the plunger and its stem will, at about the same time, engage with washer 17. It is evident that further inward movement of the plunger is now resisted with increasing force by both springs. The result of this action is that the cushions move easily at first, thereby giving efficient cushioning; but, after they have moved a short distance, the resistance to further movement rapidly increases. In other words, while the cushions may move easily at first, they are not easily moved far.

The heads on the outer ends of the plungers are of such size and the barrels are arranged in such relation to each other, substantially as shown, that the heads in each row overlap heads in adjacent rows. It, therefore, is never possible for one of the cushions, as the wheel rotates, to move out of contact with the road bed until another cushion has moved into contact therewith.
While the described arrangement of springs and associated parts is shown as part of a wheel, it is adapted for use in any other connection when a cushion having the described action is required.
Having described my invention, I claim:

1. In a cushion tired wheel, the combination of a rim having a plurality of radial spring barrels and cushions projecting respectively therefrom, two springs within the spring barrel arranged so that normally one spring resists the inward movement of the cushion and the other spring assists the initial inward movement of the cushion with gradually decreasing force and ultimately resists the inward motion of said cushion.

2. In a cushion tired wheel, the combination of a rim carrying a plurality of radial spring barrels each of which contains one spring seat between its ends and another spring seat near its inner end, with the following mechanism associated with each spring barrel, to wit, a plunger movable in the outer end of said spring barrel and projecting outward therefrom and having at its outer end an enlarged head and having a stem projecting from its inner end through both spring seats, a coiled spring embracing the plunger between the head and one of said spring seats, another spring embracing the stem between the two spring seats, washers embracing the stem between the spring seats and at opposite ends respectively of the last mentioned spring, and a nut screwed onto the inner end of said stem for applying tension to both springs.

3. In a cushion tired wheel, the combination of a rim carrying a plurality of radial spring barrels each of which contains one spring seat between its ends and another spring seat near its inner end, with the following mechanism associated with each spring barrel, to wit, a plunger movable in the outer end of said spring barrel and projecting outward therefrom and having at its outer end an enlarged head and having a stem projecting from its inner end through both spring seats, a coiled spring embracing the plunger between the head and one of said spring seats, another spring embracing the stem between the two spring seats, washers embracing the stem between the spring seats and at opposite ends respectively of the last mentioned spring, a sleeve embracing the stem and passing through the inner spring seat and engaging with the adjacent washer, and a nut screwed onto the inner end of the stem and engaging with said sleeve.

4. A spring cushion for wheels and analogous purposes consisting of a spring barrel having one spring seat near its end and another between its ends, a plunger movable in one end of said spring barrel and having a head outside of said spring barrel and having a stem projecting from the other end of said plunger and extended through both spring seats, a coiled spring embracing the plunger between the head and one spring seat, a second coiled spring embracing the stem between the spring seats, two washers embracing the stem between the spring seats and at opposite ends of the second spring and adapted for engagement respectively with said spring, a sleeve embracing the stem and passing through one of the spring seats and engaging with one of the washers, and a nut screwed onto said stem and engaging with said sleeve.

5. In a cushion tired wheel, the combination of a rim having a plurality of spring barrels extending radially through it, a hub which is fitted within and secured to said rim and whose periphery serves as an inner spring seat for said spring barrels, and cushions operating in and projecting from said spring barrels.

6. In a cushion tired wheel, the combination of a rim made of two counterpart sections, each having a row of radial spring barrels, means connecting said sections together, and a hub which is fitted within and secured to said rim.

In testimony whereof, I hereunto affix my signature in the presence of two witnesses.

JASPER MURREY.

Witnesses:
E. L. Thurston,
E. B. Gilchrist.